United States Patent
Han et al.

(10) Patent No.: US 10,783,885 B2
(45) Date of Patent: Sep. 22, 2020

(54) IMAGE DISPLAY DEVICE, METHOD FOR DRIVING THE SAME, AND COMPUTER READABLE RECORDING MEDIUM

(71) Applicant: Samsung Electronics Co., Ltd., Suwon-si, Gyeonggi-do (KR)

(72) Inventors: Sung-won Han, Seoul (KR); Young Yoon, Seoul (KR); Dae-hyun Ban, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/969,262

(22) Filed: May 2, 2018

(65) Prior Publication Data

US 2018/0254043 A1  Sep. 6, 2018

Related U.S. Application Data

(63) Continuation of application No. 14/854,759, filed on Sep. 15, 2015, now Pat. No. 9,984,687.

(30) Foreign Application Priority Data

Sep. 16, 2014 (KR) .................. 10-2014-0122871

(51) Int. Cl.
| | | |
|---|---|---|
| *G10L 15/22* | (2006.01) | |
| *G10L 15/18* | (2013.01) | |
| *G10L 15/04* | (2013.01) | |
| *G10L 21/10* | (2013.01) | |
| *G06F 16/9032* | (2019.01) | |

(52) U.S. Cl.
CPC ........ *G10L 15/22* (2013.01); *G06F 16/90328* (2019.01); *G10L 15/04* (2013.01); *G10L 15/1815* (2013.01); *G10L 21/10* (2013.01); *G10L 15/1822* (2013.01); *G10L 2015/223* (2013.01)

(58) Field of Classification Search
CPC ....................................... G10L 15/22
See application file for complete search history.

(56) References Cited

U.S. PATENT DOCUMENTS

| | | | | |
|---|---|---|---|---|
| 8,346,791 | B1* | 1/2013 | Shukla ............... | G06F 16/3325 707/759 |
| 8,521,531 | B1* | 8/2013 | Kim ..................... | G10L 15/22 704/252 |
| 8,676,828 | B1* | 3/2014 | Agarwal ............. | G06F 17/2247 707/767 |
| 2004/0002956 | A1* | 1/2004 | Chaudhuri .......... | G06F 16/2456 |
| 2004/0039562 | A1* | 2/2004 | Haase ................. | G06F 17/2735 704/1 |
| 2004/0210443 | A1* | 10/2004 | Kuhn .................... | G10L 15/22 704/276 |

(Continued)

*Primary Examiner* — Douglas Godbold
(74) *Attorney, Agent, or Firm* — Jefferson IP Law, LLP

(57) ABSTRACT

An image display device, a method for driving the same, and a computer readable recording medium are provided. The image display device includes a speech acquirer configured to acquire a speech query associated with a query created by a user, a display configured to display a query list composed of candidate queries having the same as or similar semantic as the acquired speech query, and an operation performer configured to perform an operation related to the query selected from the displayed query list.

18 Claims, 15 Drawing Sheets

(56) References Cited

U.S. PATENT DOCUMENTS

| | | | |
|---|---|---|---|
| 2005/0080625 A1* | 4/2005 | Bennett | G10L 15/005 704/249 |
| 2005/0080776 A1* | 4/2005 | Colledge | G06F 17/2785 |
| 2007/0225980 A1* | 9/2007 | Sumita | G10L 15/1815 704/240 |
| 2008/0154828 A1* | 6/2008 | Antebi | G06N 5/022 706/46 |
| 2008/0162472 A1* | 7/2008 | Cheng | G06F 3/16 |
| 2008/0248797 A1* | 10/2008 | Freeman | H04M 1/72522 455/425 |
| 2010/0005081 A1* | 1/2010 | Bennett | G06F 17/27 704/9 |
| 2010/0094854 A1* | 4/2010 | Rouhani-Kalleh | G06F 16/3325 707/706 |
| 2010/0153324 A1* | 6/2010 | Downs | G06F 17/2745 706/21 |
| 2011/0202563 A1* | 8/2011 | Colledge | G06F 17/2785 707/780 |
| 2011/0295590 A1* | 12/2011 | Lloyd | G10L 15/065 704/8 |
| 2011/0301941 A1* | 12/2011 | De Vocht | G06F 17/2715 704/9 |
| 2011/0314006 A1* | 12/2011 | Sweeney | G06F 17/2785 707/723 |
| 2012/0143895 A1* | 6/2012 | Salvetti | G06F 16/3329 707/769 |
| 2012/0150874 A1* | 6/2012 | Sweeney | G06F 17/2785 707/749 |
| 2014/0188862 A1* | 7/2014 | Campbell | G06Q 50/01 707/728 |
| 2014/0288934 A1* | 9/2014 | Kennewick | G06Q 30/0261 704/254 |
| 2014/0303975 A1* | 10/2014 | Ohmura | G10L 15/22 704/235 |
| 2015/0066479 A1* | 3/2015 | Pasupalak | G06F 17/27 704/9 |
| 2015/0213084 A1* | 7/2015 | Jeyakeerthi | G06F 16/24 707/758 |
| 2015/0213796 A1* | 7/2015 | Waltermann | G10L 15/18 704/257 |
| 2015/0228276 A1* | 8/2015 | Baldwin | G10L 15/22 704/257 |

\* cited by examiner

IMAGE DISPLAY DEVICE, METHOD FOR DRIVING THE SAME, AND COMPUTER READABLE RECORDING MEDIUM

CROSS-REFERENCE TO RELATED APPLICATION(S)

This application is a continuation application of prior application Ser. No. 14/854,759, filed on Sep. 15, 2015, which claimed priority under 35 U.S.C. § 119(a) of a Korean patent application filed on Sep. 16, 2014 in the Korean Intellectual Property Office and assigned Ser. No. 10-2014-0122871, the entire disclosure of which is hereby incorporated by reference.

TECHNICAL FIELD

The present disclosure relates to an image display device, a method for driving the same, and a computer readable recording medium. More particularly, the present disclosure relates to an image display device, which can present candidate queries related to a query that is created by a user in a device, such as a television (TV) or a portable phone, and if the user selects a desired query, provide a search for the selected query or answer information, a method for driving the same, and a computer readable recording medium.

BACKGROUND

Speech recognition identifies linguistic semantic content from speech. For example, speech recognition corresponds to a process of identifying a word or a word string through an input of speech waveforms and extracting semantics associated with the identified word or word string. Different techniques may be used on a speech waveform to identify words or word strings. In an exemplary embodiment, the different speech recognition techniques may be classified into five processes including speech analysis, phoneme recognition, word recognition, sentence interpretation, and semantic extraction. However, performing all of the different techniques on a speech waveform is undesirably complex. Therefore, conventional speech recognition methods generally include at least one of the processes of speech analysis, phoneme recognition, and word recognition.

Previously, the hardware necessary to implement a human-machine speech recognition interface has undesirably limited the use of speech recognition. However, with the development of large-scale integrated circuits, a speech recognition device and a voice synthesis device can be realized on an integrated circuit having a size of several millimeters in width and length, and thus allows a speech input/output device to be more easily implemented.

In an exemplary embodiment, a speech input/output device may be used to receive a bank balance inquiry, a stock price inquiry, an application of communication sales, a credit card inquiry, a hotel or flight seat reservation, etc. via phone. However, a common problem associated with general inquiries using natural language based speech question and answer (Q/A) services, such as S-Voi** or Si-*, is that there are too many questions that are unable to be understood. Further, when the Q/A services are implemented using cloud computing techniques, an increase in response delays with respect to a natural language query introduces undesirable network interruptions. When network interruptions occur, it is not possible for the device to perform additional speech recognition Q/A services.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an image display device, which can present candidate queries related to a query that is created by a user in a device, such as a television (TV) or a portable phone, and if the user selects a desired query, provide a search for the selected query or answer information, a method for driving the same, and a computer readable recording medium.

In accordance with an aspect of the present disclosure, an image display device is provided. The image display device includes a speech acquirer configured to acquire a speech query associated with a query created by a user, a display configured to display a query list composed of candidate queries having the same or similar semantic as the acquired speech query, and an operation performer configured to perform an operation related to the query that is selected from the displayed query list.

In accordance with another aspect of the present disclosure, a method for driving an image display device is provided. The method includes acquiring a speech query associated with a query created by a user, displaying a query list composed of candidate queries having the same or similar semantic as or to a semantic of the acquired speech query, and performing an operation related to the query selected from the displayed query list.

In accordance with another aspect of the present disclosure, a non-transitory computer readable recording medium is provided. The non-transitory computer readable recording medium includes a program for executing a method for driving an image display device, wherein the method for driving an image display device includes acquiring a speech query associated with a query created by a user, generating a query list that is composed of candidate queries having the same or similar semantic as a semantic of the acquired speech query, and providing search information or answer information for the query that is selected from the query list.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
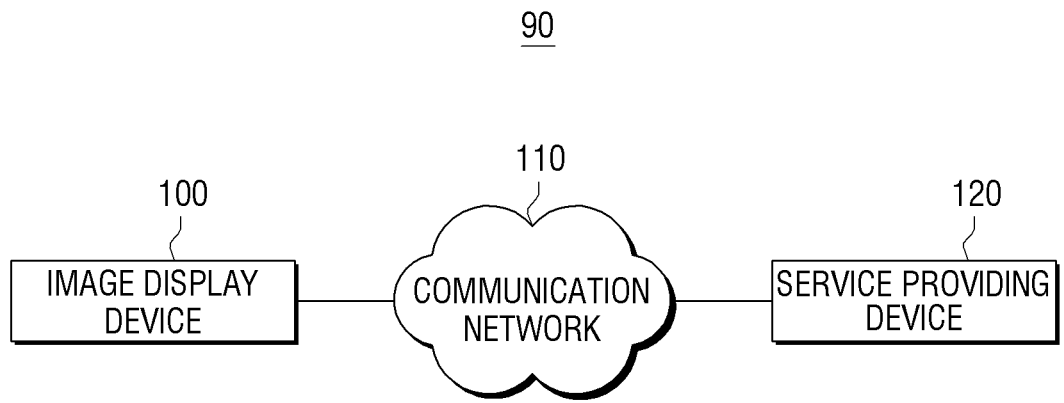
FIG. 1 is a diagram illustrating a speech service system according to an embodiment of the present disclosure.
Figure 2:
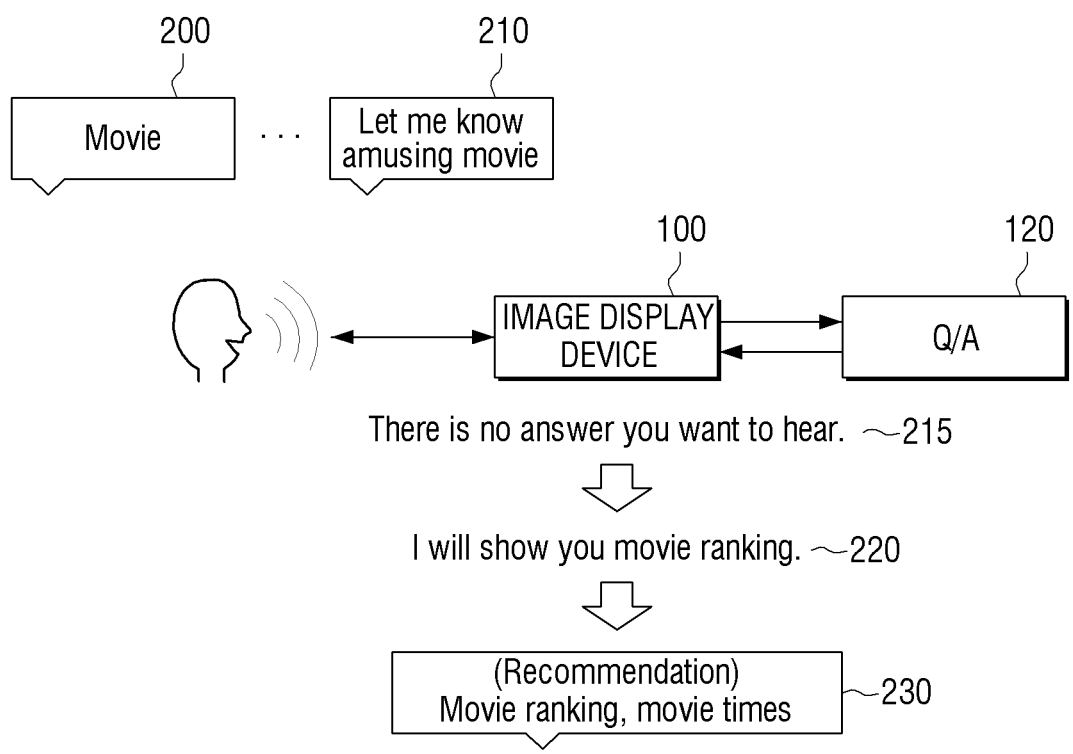
FIG. 2 is a diagram explaining a speech service according to an embodiment of the present disclosure.

FIG. 1 is a diagram illustrating a speech service system according to an embodiment of the present disclosure, and FIG. 2 is a diagram explaining a speech service according to an embodiment of the present disclosure.

Referring to FIG. 1, a speech service system 90 according to an embodiment of the present disclosure may include a part or the whole of an image display device 100, a communication network 110, and a service providing device 120.

The term "include a part or the whole" means that some constituent elements, such as the communication network 110 and the service providing device 120, are omitted and the image display device 100 can solely operate. For sufficient understanding of the present disclosure, explanation will be made on the assumption that the speech service system 90 includes the whole constituent elements.

The image display device 100 according to an embodiment of the present disclosure includes, for example, a television (TV), a display panel such as an organic light emitting diode (OLED), liquid crystal display (LCD), a plasma display panel, etc., a portable phone, a portable DVD player, a Moving Picture Experts Group phase 1 or phase 2 (MPEG-1 or MPEG-2) audio layer 3 (MP3) device, a tablet personal computer (PC), or a laptop and desktop computer, which can display an image. In order to increase the response rate, speed, and availability of a natural language question and answer (Q/A) service, the image display device 100 may perform two types of operations. One operation constructs information in order to provide candidate queries for a query created by a user and the other operation performs rapid information processing through recognition of the query created by the user based on the constructed information.

For example, the image display device 100 may receive query information from the service providing device 120 as the result of recognition associated with a user's initial query. The query information may be information having the same or similar semantic as or to the semantic of the result of recognition. Further, the image display device 100 may receive additional query information as the result of recognition that the service providing device 120 provides with respect to a query having the same semantic as the semantic of the initial query although the expression type of the initial query may be different from the expression type of the subsequent query. The image display device 100 can generate or construct information for candidate queries using various portions of query information that may have the same semantic although the expression types are different from each other. Thereafter, even if a user creates various types of queries, for example, "movie", "Take me to a movie", and "Recommend an amusing movie", the image display device 100 may search for candidate queries having the same or similar semantic as or to the semantic of the query and provide the searched candidate queries in the form of a list. In this case, the query may be provided in various forms such as a word, a sentence, or a domain. In the case of a domain, when a user mentions only a domain with respect to the query, domain queries of the previous record in the domain related storage, for example, a cache, or a top-k that exists in the service providing device 120 can be directly recommended. In an exemplary embodiment, the top-k is a query for obtaining k objects that a user desires most.

Referring to FIG. 2, when a user intends to obtain information about a movie, different types of queries, such as "movie" 200 and "Let me know an amusing movie" 200, may be created (or uttered) by the user. Even if the user creates different types of queries, the image display device 100 may derive a common semantic from them and present candidate queries on the display device 100 in order to determine the user's query more accurately and clearly on based on the derived semantic. In this case, the candidate queries should commonly include the derived semantic. For example, if two semantics are derived, the candidate queries should include only two semantics. If the intention is not accurately determined as shown in FIG. 2 or in order to grasp the intention more accurately, the image display device 100 may present "I will show you movie ranking" 220. If the user selects this, the image display device 100 may provide the result of the search, such as "prepared movie raking" or "movie times" 230. In this process, if separately prepared information does not exist, the image display device 100 may display a notification and may provide a query that is set by default or search or answer information by a default operation. In other words, if separate information is not prepared as shown in FIG. 2, the image display device 100 may provide an audio notification such as "There is no answer you want to hear" 215, or "I will show you the movie ranking" 220, and then may directly provide the information by displaying the associated information on the display device 100.

Further, when the speech query (or speech waveform, speech signal) is received from the user, the image display device 100 may recognize the received speech query and may first determine whether any candidate query stored at the image display device 100 exists based on the result of the recognition. This is related to the response rate. If there is a candidate query that can be provided to the user as the result of recognition, the image display device 100 may provide a list including the candidate query. When it is determined that there is not a candidate query, the image display device 100 may receive candidate queries from the service providing device 120 and provide the candidate queries in the form of a list displayed at the image display device 100. Alternatively, the image display device 100 may display the candidate queries based on the result of recognition performed by the service providing device 120. However, if an error occurs in the communication network 110 or if a network device in the communication network 110 and the service providing device 120 experience excessive loads, the image display device 100 may smoothly operate, such as using candidate queries stored at the image display device 100. For example, the image display device 100 can include an engine for speech recognition, i.e., a program. Further, the engine may selectively operate according to user's selection or situation.

Alternatively, Nave* Knowledge*, Yah Answe provide services through a search for mass Q/A sets that are constructed in cloud computing networks. In order to provide the same service through a mobile device, it is necessary to provide Q/A sets having a scale associated with the mobile device. However, due to the resource limitations of the mobile device (central processing unit (CPU) or storage space that is required to search for mass amount of Q/A sets), it is difficult to construct the Q/A sets associated with a mobile device to have the same scale as a Q/A set associated with a cloud computing network. Accordingly, in an embodiment of the present disclosure, the Q/A sets associated with a mobile device are constructed to maintain the search hit rate that is similar to that of a Q/A set associated with a cloud computing network such that the scale of the Q/A sets associated with a mobile device are reduced to suit the mobile device.

For example, since the Q/A that the user can use may differ according to the time and place, the image display device 100, more accurately, a mobile terminal, may change the Q/A set configuration according to the time and place in consideration of user's situation, a profile, and a past Q/A usage pattern. For example, since a user frequently asks a weather question in the morning, a weather Q/A is included in the set. However, in the afternoon, the weather Q/A may be excluded from the Q/A set. Further, if a user is in the vicinity of a movie theater, movie time Q/A is included in the set, but is excluded from the set in other regions. Further, the result of a search when the user asks a "neighboring restaurant search" question in a first location may differ from the result of search when the user makes a "neighboring restaurant search" in a different location.

The communication network 110 includes both wired and wireless communication networks. The wired network may include the Internet, such as a cable network or a public switched telephone network (PSTN), and the wireless communication network may include code division multiple access (CDMA), wireless CDMA (WCDMA), global system for mobile communications (GSM), evolved packet core (EPC), long term evolution (LTE), and wibro. However, the communication network 110 according to an embodiment of the present disclosure is not limited thereto, but may be used, for example, in a cloud computing network under cloud computing environment such as a connection network of the next-generation mobile communication system to be implemented in future. For example, if the communication network 110 is a wired communication network, an access point in the communication network 100 can connect to an exchange of a telephone office, whereas in the case of a wireless communication network, the access point may connect to a serving general packet radio service (GPRS) support node (SGSN) or gateway GPRS support node (GGSN) operated by a communication company to process data, or may connect to various repeaters, such as base transceiver station (BTS), NodeB, and e-NodeB to process data.

The communication network 110 may include an access point. The access point includes a small base station, such as a femto or pico base station, which is mainly installed in a building. The femto or pico base station may be classified depending on a maximum number image display devices 100 that can establish communication with the femto or pico base station according to classification of a small base station. The access point includes a near field communication module for performing near field communication, such as ZigBee or Wi-Fi, with the image display device 100. The access point may use transmission control protocol/Internet protocol (TCP/IP) or real-time streaming protocol (RTSP) to perform wireless communication. Near field communication may be performed in various standards, such as radio frequency (RF) and ultra wideband (UWB) communication, such as Bluetooth (BT), ZigBee, infrared rays (IrDA), ultra high frequency (UHF), and very high frequency (VHF). Accordingly, the access point may extract the position of a data packet, designate the best communication path for the extracted position, and transfer the data packet to a next device, for example, the image display device 100 along the designated communication path. The access point can share several lines in a general network environment, and may include, for example, a router, a repeater, and a relay.

The service providing device 120 may operate as cloud server, and may be called an external device or a recognition result providing device. In an exemplary embodiment, the result of recognition may include providing information associated with candidate queries beyond providing text-based information for a speech query. The service providing device 120 may include a free creation engine and by executing the free creation engine, the service providing device 120 recognizes a speech signal that is provided from the image display device 100 and provides the result of the recognition to the image display device 100 in a text based manner. In an exemplary embodiment, the free creation engine may be a type of speech recognition engine that can provide the result of recognition more accurately as a high performance engine in comparison to a fixed creation engine of the image display device 100.

One of ordinary skill in the art would recognize that the service providing device 120 according to an embodiment of the present disclosure is not limited to a cloud server. For example, in the case where the communication network 110 is omitted and the image display device 100 performs direct communication with the service providing device 120, the service providing device 120 may be an external device, i.e., an access point, or a peripheral device, such as a desktop computer. In other words, any type of service providing device 120 can be used so far as the service providing device 120 provides the result of recognition for the speech signal that is provided by the image display device 100 as well as information associated with candidate queries. The service providing device 120 may be a recognition result providing device.

In operation, in order to increase the response rate of the natural language Q/A service, the image display device 100 according to an embodiment of the present disclosure searches for candidate queries that are similar to the user's query among the Q/A that responded in the past, and responds to the query using the response related to the searched query other than understanding the natural language and responding to the user's question. Since the response is provided through the Q/A search, in the case where the service is frequently used and the Q/A set becomes large, the probability to search for the similar Q/A is increased to cause the response rate also increase thereby causing delays. However, in order to provide the search-based Q/A service through a mobile terminal such as a portable phone having limited resources (e.g., CPU and storage), the Q/A set should not be extended unlimitedly. In order to provide the Q/A service through the mobile terminal, the personalized Q/A set may be constructed based on the user situation, the user profile, and the past Q/A usage pattern. The Q/A service providing in the mobile terminal may have the advantages of shortening service response time and increase reliability to provide the service even in the case of network interruption.

Figure 3:
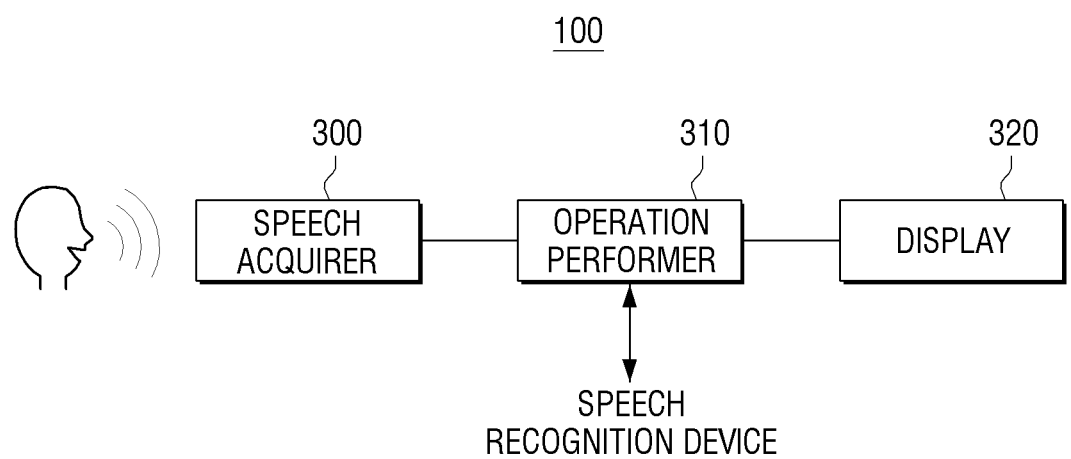
FIG. 3 is a block diagram illustrating a structure of an image display device of FIG. 1 according to an embodiment of the present disclosure.

FIG. 3 is a block diagram illustrating the structure of an image display device of FIG. 1 according to an embodiment of the present disclosure.

Referring to FIG. 3, an image display device 100 according to an embodiment of the present disclosure may include a part or the whole of a speech acquirer 300, an operation performer 310, and a display 320.

The term "include a part or the whole" means that a part of constituent elements, such as the speech acquirer 300, is omitted, or another constituent element, such as the operation performer 310, is integrally configured. For sufficient understanding of the present disclosure, explanation will be made on the assumption that the image display device 100 includes the whole constituent elements.

The speech acquirer 300 may include a microphone. The speech acquirer 300 may acquire a speech created by a user through the microphone and may provide the created speech to the operation performer 310. That is, the speech acquirer 300 generates and provides a speech signal of the acquired speech waveform.

Further, the operation performer 310 may perform the same operation as the operation of the constituent elements as described above through execution of a part or the whole of a program even if the operational performer 310 is not discriminated in hardware from the controller (as referring to FIG. 4), the speech recognizer, the communication interface, and the user interface (UI) screen generator. For example, the operation performer 310 is provided with an engine for speech recognition by itself, and may obtain the result of recognition for the speech query created by the user through driving of the speech recognition engine. Further, the operation performer 310 may transmit the speech signal to an external service providing device 120 and may receive the result of recognition from the external service providing device 120. Further, the operation performer 310 may selectively use an internal engine and an external engine to obtain the result of the recognition.

Alternatively, the operation performer 310 may generate semantic information through, for example, word division and semantic derivation using the text-based result of recognition. Further, the operation performer 310 may acquire candidate queries associated with the generated semantic information and generate the acquired candidate queries in the form of a list to be transferred or shown to the user. For example, the operation performer 310 may provide the generated list to the display 320 such that the generated list is displayed on the display 320. Further, in the case where the image display device 100 is a TV, the operation performer 310 may transfer the list to a user's portable phone in the form of a push message so as to select a desired answer. The operation performer 310 may search for the candidate queries stored in the storage provided at the image display device 100 or may receive the candidate queries from the external service providing device 120 in order to acquire the candidate queries.

Thereafter, the operation performer 310 receives information associated with the query selected by the user from the list that is displayed on the user's portable phone or the display 320 and provides search or answer information for the query to the user. The search or answer information may be provided to the display 320 or the search and answer information may be transmitted to the user's portable phone.

In addition, the operation performer 310 may include an image processor configured to perform an operation function or may replace the operation through a program. In other words, the operation performer 310 may perform various operations, such as receiving and separating a video/audio signal that is received from an external broadcasting device, and scaling the encoded and decoded video/audio signal. In an exemplary embodiment, the operation performer 310 may include a tuner, a signal separator, a decoder, and a scaler in hardware, or may replace their operations through execution of a part of the whole of the program.

The display 320 displays a list of candidate queries that are transferred from the operation performer 310 according to an embodiment of the present disclosure. The candidate queries may be the same as or similar to the query information of the speech query created by the user and more particularly, may be composed of queries having the same semantic, i.e., semantic information. For example, a semantic may be a keyword or a new one derived from the keywords. This will be described in more detail with reference to FIGS. 4 and 5.

Figure 4:
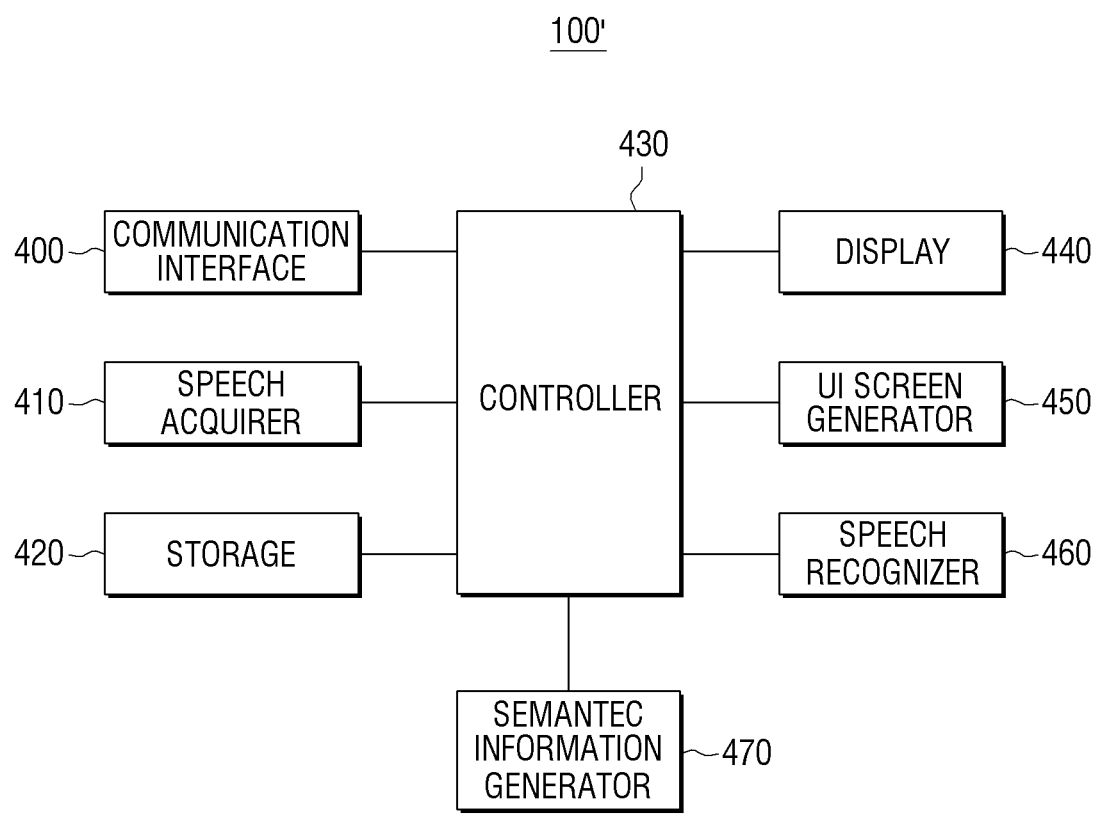
FIG. 4 is a block diagram illustrating another structure of an image display device of FIG. 1 according to an embodiment of the present disclosure.
Figure 5:
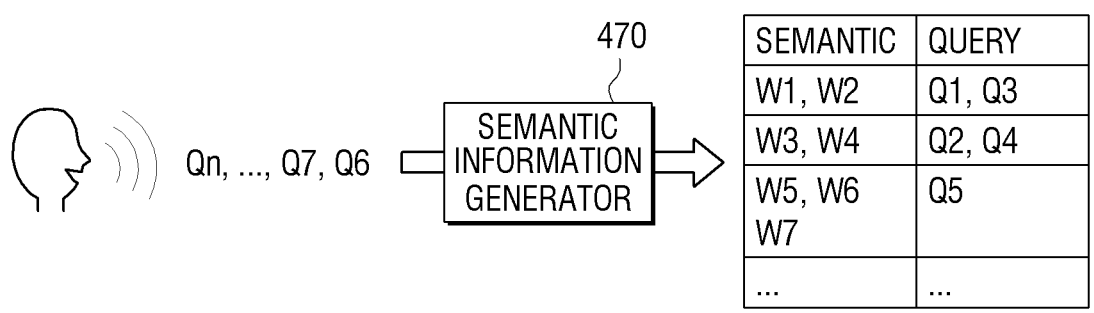
FIG. 5 is a diagram explaining an operation of a semantic information generator of FIG. 4 according to an embodiment of the present disclosure.

FIG. 4 is a block diagram illustrating another structure of an image display device of FIG. 1 according to an embodiment of the present disclosure, and FIG. 5 is a diagram explaining the operation of a semantic information generator of FIG. 4 according to an embodiment of the present disclosure.

Referring to FIG. 4, an image display device 100' according to an embodiment of the present disclosure may include a part or the whole of a communication interface 400, a speech acquirer 410, a storage device 420, a controller 430, a display 440, a UI screen generator 450, and a speech recognizer 460.

The term "include a part or the whole" means that a part of constituent elements, such as the speech recognizer 460, is omitted or a part of constituent elements, such as the storage 420 or the UI screen generator 450, is integrally configured with the controller 430. For sufficient understanding of the present disclosure, explanation will be made on the assumption that the image display device 100' includes the whole constituent elements.

According to an embodiment of the present disclosure, being aside from the processing of image data for image processing, the communication interface 400 may transmit a speech signal associated with a speech waveform that is acquired from the speech acquirer 410 to the external service providing device 120 and may receive the result of recognition for the speech signal. For example, in the case where the image display device 100' is configured to use the service providing device 120 to obtain the result of a recognition, the communication interface 400 may first attempt communication with the service providing device 120 to obtain the result of the recognition, and if an error occurs in the communication network 110 or if a load becomes heavy at one or more network nodes, the communication interface 400 may notify the controller 430. Accordingly, the controller 430 may operate the internal speech recognizer 460 to obtain the result of recognition.

Further, the communication interface 400 may perform communication with an external device to obtain response or search information associated with the query selected by the user from the candidate query list that is displayed on the display 440. For example, if the user requests a movie ranking through query selection on the list, the communication interface 400 may perform an operation to connect to a server of a professional search portal site, such as Nave*. In other words, the communication interface 400 requests the corresponding information and receives a result of request. In this process, various operations for converting the information, such as decoding operation, may be performed.

Speech acquirer 410 is similar to the speech acquirer 300 as described above with reference to FIG. 3 and thus further description is omitted.

The storage 420 may store various portions of data or information that is processed at the image display device 100'. For example, in an embodiment of the present disclosure, information associated with the candidate queries may be stored to match the semantic information. In other words, as shown in FIG. 5, candidate queries Q1 and Q3 are stored to match semantic information W1 and W2. Accordingly, if the semantic information W1 and W2 are derived as the result of the query created by the user, the storage unit 420 may output information on the queries Q1 and Q3 that include two semantics W1 and W2. In practice, such a process may be performed in association with a semantic information generator 470.

Referring to FIG. 4, the storage 420 may use the semantic information generator 470 in order to correlate the query information for the candidate queries with the semantic information to be stored or in order to derive the semantic information from the query created by the user to search for a desired candidate query. In this case, the query information for the candidate queries may be constructed using the results of a recognition that are provided from the service providing device 120 of FIG. 1 through repeated experiences of the image display device 100' or mechanical learning. Based on this, the storage 420 can periodically update the internal query information and delete unused query information.

The controller 430 controls the whole operation of the communication interface 400, the speech acquirer 410, the storage 420, the controller 430, the display 440, the UI screen generator 450, and the speech recognizer 460 in the image display device 100'. The controller 430 provides the result of recognition for the speech waveform that is acquired by the speech acquirer 410 to the semantic information generator 470 to obtain the semantic information and based on the semantic information, searches for candidate queries including corresponding semantic information in the storage 420. Thereafter, the controller 430 provides the information associated with the searched candidate queries to the UI screen generator 450 to generate a list and then displays the list on the display 440. Further, in the case of a touch screen type, the controller 430 obtains the search or answer information for the query selected by the user through communication with an external device through the communication interface 400 and displays the search or answer information on the display 440 again.

In addition, the controller 430 may perform an operation for image processing. Since an image processing operation has been fully described through the operation performer 310 of FIG. 3, further explanation thereof will be omitted.

Moreover, display 440 is similar to the display 320 of FIG. 3 and further explanation thereof is also omitted.

The UI screen generator 450 may generate a candidate query list based on the query information for the candidate queries provided from the storage 420 under the control of the controller 430. In response to the request from the controller 430, the UI screen generator 450 may output the generated list.

The speech recognizer 460 provides the result of a recognition associated with the speech query acquired through the speech acquirer 410. The speech recognizer 460 according to an embodiment of the present disclosure may be selectively driven. For example, if the speech recognizer 460 of the image display device 100' is configured to perform recognition without using the external service providing device 120 to obtain the result of recognition or if the conditions selected by the user are satisfied, such as if an error occurs in the communication network 110 or the communication network 110 has severe loads, or if the inner loads of the service providing device 120 become severe, the speech recognizer 460 may selectively operate.

When the image display device 100' initially operates, there is no information for generating candidate queries, and thus the semantic information generator 470 may receive various types of recognition results from the external service providing device 120. The result of recognition may include candidate query information. The semantic information generator 470 may generate the semantic information using the provided result of the recognition and make the generated semantic information match a plurality of recognition results, i.e., query information. In this process, the semantic information generator 470 may separate a word from the recognition result in the form of a sentence, add part of speech information through tagging, i.e., discriminating, of the part of speech and then generate index information. For example, the index information may be a serial number associated with the semantic information. In an exemplary embodiment, if it is assumed that 32 pieces of semantic information are provided, the pieces of semantic information may be expressed by 32-bit data and each piece of bit information may correspond to the semantic information. In this case, if only two pieces of semantic information W1 and W3 exist, the index information may be generated in a manner that first and third data of the 32-bit data are marked "1". If a query is input from an outside, the candidate queries may be searched by comparing index information. In addition, hashing may be used as a method for searching for the candidate queries. Hashing is a calculation search method that calculates and finds the location where a key exists using an arithmetic operation other than a search method through comparison of the key values.

Referring to FIG. 5, the semantic information generator 470 may generate the semantic information and provide information associated with the candidate query that matches the generated semantic information to the controller 430. Then, the controller 430 sorts and stores the corresponding contents in the storage 420. If the semantic information generator 470 is integrated into the controller 430, it may become possible to directly sort and store the generated information in the storage 420. However, the embodiment of the present disclosure may not be specially limited thereto.

Figure 6:
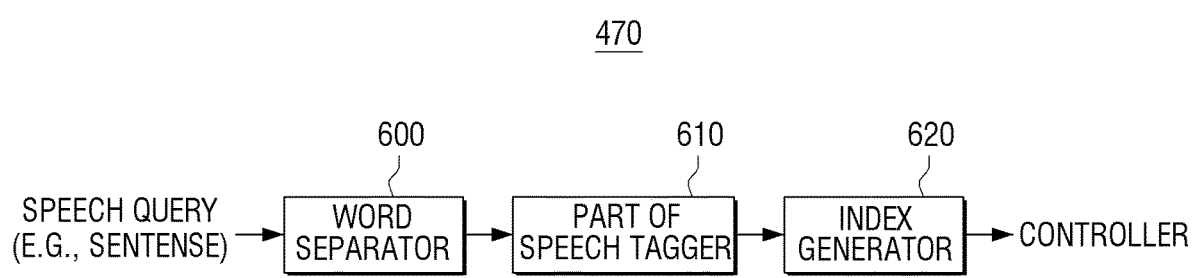
FIG. 6 is a block diagram illustrating a detailed structure of a semantic information generator of FIGS. 4 and 5 according to an embodiment of the present disclosure.

FIG. 6 is a block diagram illustrating the detailed structure of a semantic information generator of FIGS. 4 and 5 according to an embodiment of the present disclosure.

The semantic information generator 470 according to an embodiment of the present disclosure can store software in the structure as shown in FIGS. 4 and 5, and can perform various operations through execution of such software. However, as illustrated in FIG. 6, the semantic information generator 470 may operate by hardware as shown in FIG. 6. Of course, respective constituent elements may include programs.

From this viewpoint, the semantic information generator 470 of FIG. 6 includes a part or the whole of a word separator 600, a part of speech tagger 610, and an index generator 620.

The term "include a part or the whole" is the same as that as described above and thus further explanation thereof will be omitted.

In an exemplary embodiment, if the word separator 600 is in the form of a sentence and the text-based recognition result is input, words may be separated based on, for example, spacing between words.

Then, the part of speech tagger 610 determines the part of speech of the word. For example, the part of speech tagger 610 determines words of predetermined parts of speech such as noun, adjective, and verb, and tags the part of speech on the word of the corresponding part of speech.

Thereafter, the index generator 620 generates index information to be matched to the input result of recognition, i.e., query, considering the corresponding words as primary keys. Since this operation has been described, further explanation thereof will be omitted.

Figure 7:
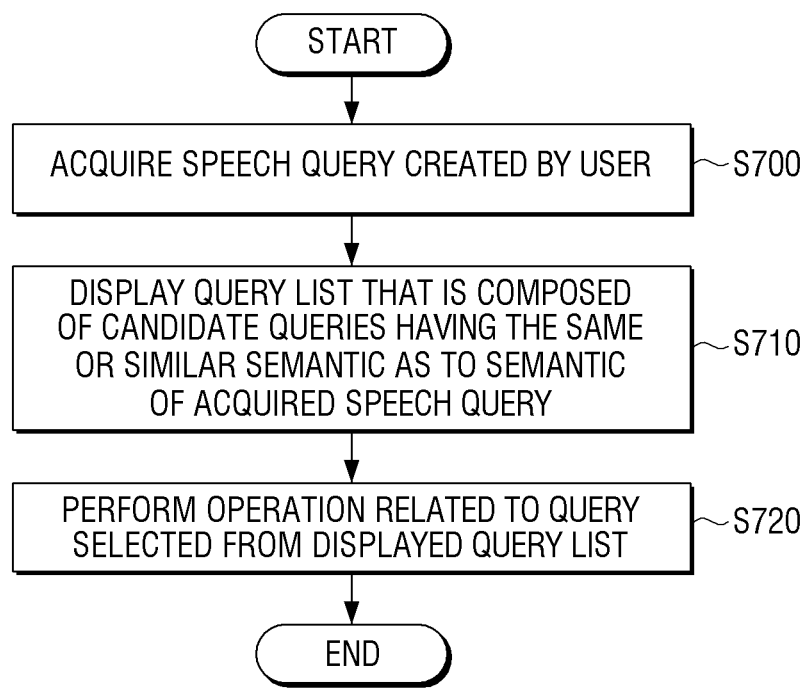
FIG. 7 is a flowchart illustrating a process of driving an image display device according to an embodiment of the present disclosure.

FIG. 7 is a flowchart illustrating a process of driving an image display device according to an embodiment of the present disclosure.

For convenience in explanation, referring to FIGS. 1 and 7, an image display device 100 according to an embodiment of the present disclosure acquires a speech query created by a user at operation S700. Thereafter, the image display device 100 may additionally perform a process for obtaining the result of recognition for the acquired query. The result of the recognition may be obtained by executing an internal engine, i.e., a program, and may be obtained using an external free creation engine.

Further, the image display device 100 displays a query list that includes candidate queries having the same as or similar semantic as to a semantic of the acquired speech query at operation S710. In an exemplary embodiment, the semantic may be expressed by at least one piece of semantic information.

Thereafter, the image display device 100 performs an operation related to the query that is selected from the query list that is displayed on the screen at operation S720.

In an exemplary embodiment, referring again to FIG. 2, if a user creates "movie" 200 or "Let me know an amusing movie" 200, the image display device 100 determines that the primary keyword is "movie". The movie may be the semantic. Further, the keyword "movie", i.e., a candidate query that matches the semantic information, "I will show you movie ranking." 220 may be provided to the user on the UI screen as a candidate query. Even if the image display device 100 does not pass through the process for selection from the list, the image display device 100 may audibly notify the user of the corresponding operation by default, and provide the result of performance to the user. Accordingly, the image display device 100 may provide information on the movie ranking or movie times 230 as the result of search.

Figure 8:
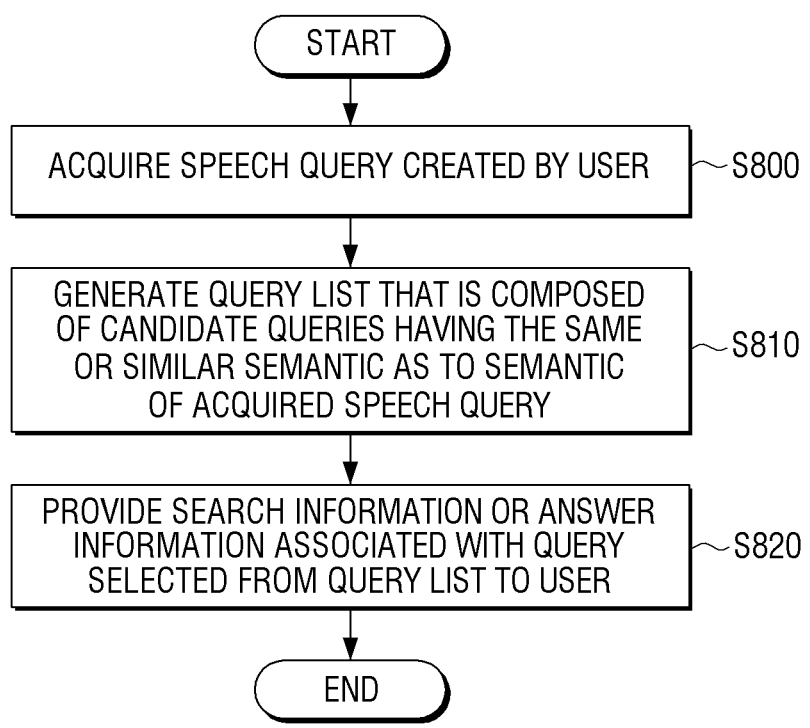
FIG. 8 is a flowchart illustrating a process of driving an image display device according to another embodiment of the present disclosure.

FIG. 8 is a flowchart illustrating a process of driving an image display device according to an embodiment of the present disclosure.

Comparing FIG. 8 with FIG. 7, an image display device 100 of FIG. 8 acquires a speech query, and generates a query list that is composed of candidate queries having the same as or similar semantic to the semantic of the acquired speech query at operations S800 and S810. Such list generation using the candidate queries may be actually performed by the UI screen generator 450 of FIG. 4.

Then, the image display device 100 processes search or answer information in order to provide the search or answer information associated with the query selected from the query list to a user at operation S820.

In an exemplary embodiment, FIG. 8 may be performed using a non-transitory computer readable recording medium, however the method illustrated in FIG. 8 may be implemented using one or more programs stored on the non-transitory computer readable recording medium.

Figure 9A:
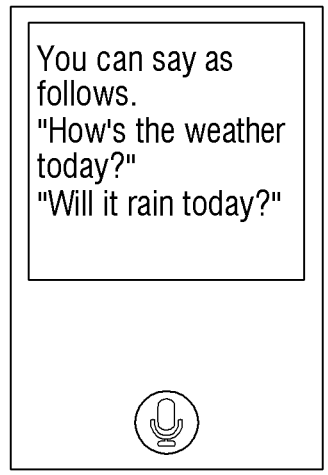
FIGS. 9A, 9B, and 9C are diagrams illustrating a screen display method of an image display device according to an embodiment of the present disclosure.
Figure 9B:
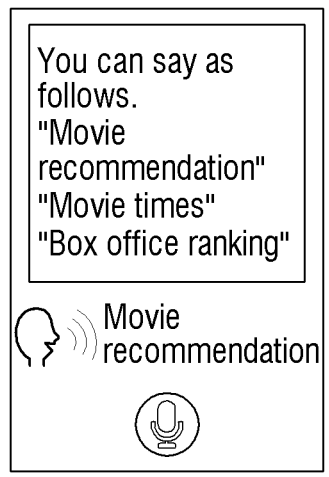
Figure 9C:
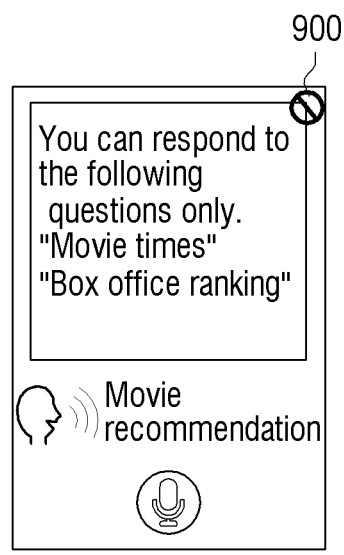

FIGS. 9A to 9C are diagrams illustrating a screen display method of an image display device according to an embodiment of the present disclosure.

Referring to FIGS. 1 and 9A to 9C, the image display device 100 presents a query using a keyword related to a situation during execution of an application.

For example, if a user creates a query "today weather" or "weather", candidate queries, such as "How's the weather today?" or "Will it rain today?" may be displayed as shown in FIG. 9A.

Further, in the case where the user inputs a query, the image display device 100 searches for similar queries, i.e., candidate queries, and presents the searched queries to the user. If the searched query is selected, the image display device 100 responds through a related answer, while if not, the image display device 100 sends the user's query to the service providing device 120 of FIG. 1 to respond through natural language understanding.

Referring to FIG. 9B, if the user creates "movie recommendation", the image display device 100 may display "movie times" and "box office ranking" in addition to "movie recommendation" that is transmitted by the service providing device 120 of FIG. 1.

The user may select the query from the list that is displayed on the screen where the selection may be performed by touching the touch screen type screen or creating a speech.

Alternatively, the image display device 100 may operate in an offline mode and show the corresponding result in accordance with the user's setting. Referring to FIG. 9C, if the image display device 100 is unable to access the Q/A service, the image display device may provide the service through a Q/A list search that is stored at the image display device 100. With respect to a query that is similar to the user's query, the image display device 100 searches for and presents the result of the search associated with the query in the image display device, and in other cases, the image display device 100 displays that there is no response. In an exemplary embodiment, as shown in FIG. 9C, an icon 900 is displayed to indicate that the current Q/A service, i.e., the service by the service providing device 120 of FIG. 1 is not provided and/or available.

As described above, the image display device 100 of FIG. 1 according to an embodiment of the present disclosure may construct a personalized Q/A set based on the user situation information (e.g., place and time), the user profile, and past Q/A usage patterns. Through this, the candidate queries as shown in FIG. 9C may be presented, and additionally required Q/A may be provided from the service providing device 120.

Figure 10:
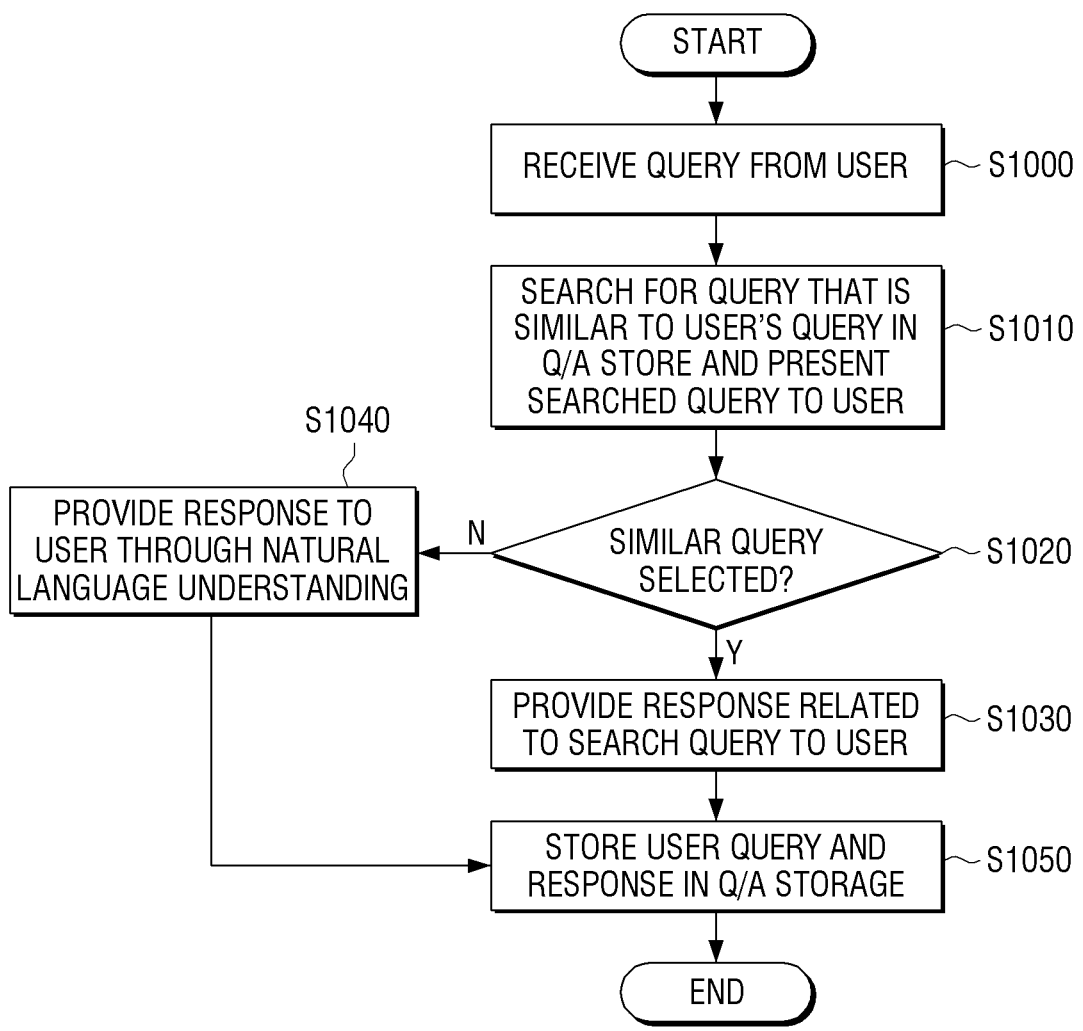
FIG. 10 is a flowchart illustrating a process of driving an image display device according to an embodiment of the present disclosure.

FIG. 10 is a flowchart illustrating a process of driving an image display device according to an embodiment of the present disclosure.

Referring to FIGS. 1 and 10, at operation S1000, an inquiry is received from a user and at operation S1010, the image display device 100 searches for a similar query stored in the storage a to determine if any previous query that is identified as similar to a previous query.

If the query selected by the user is not in the similar previous query, the image display device 100 provides a response to the user through natural language understanding (NLU) using the service providing device 120 of FIG. 1 at operations S1020 and S1040.

When the query selected is similar to a previous query, the image display device 100 provides a response related to the search query to the user at operation S1030.

Thereafter, the image display device 100 may store the user's query and the response in the storage at operation S1050.

Figure 11:
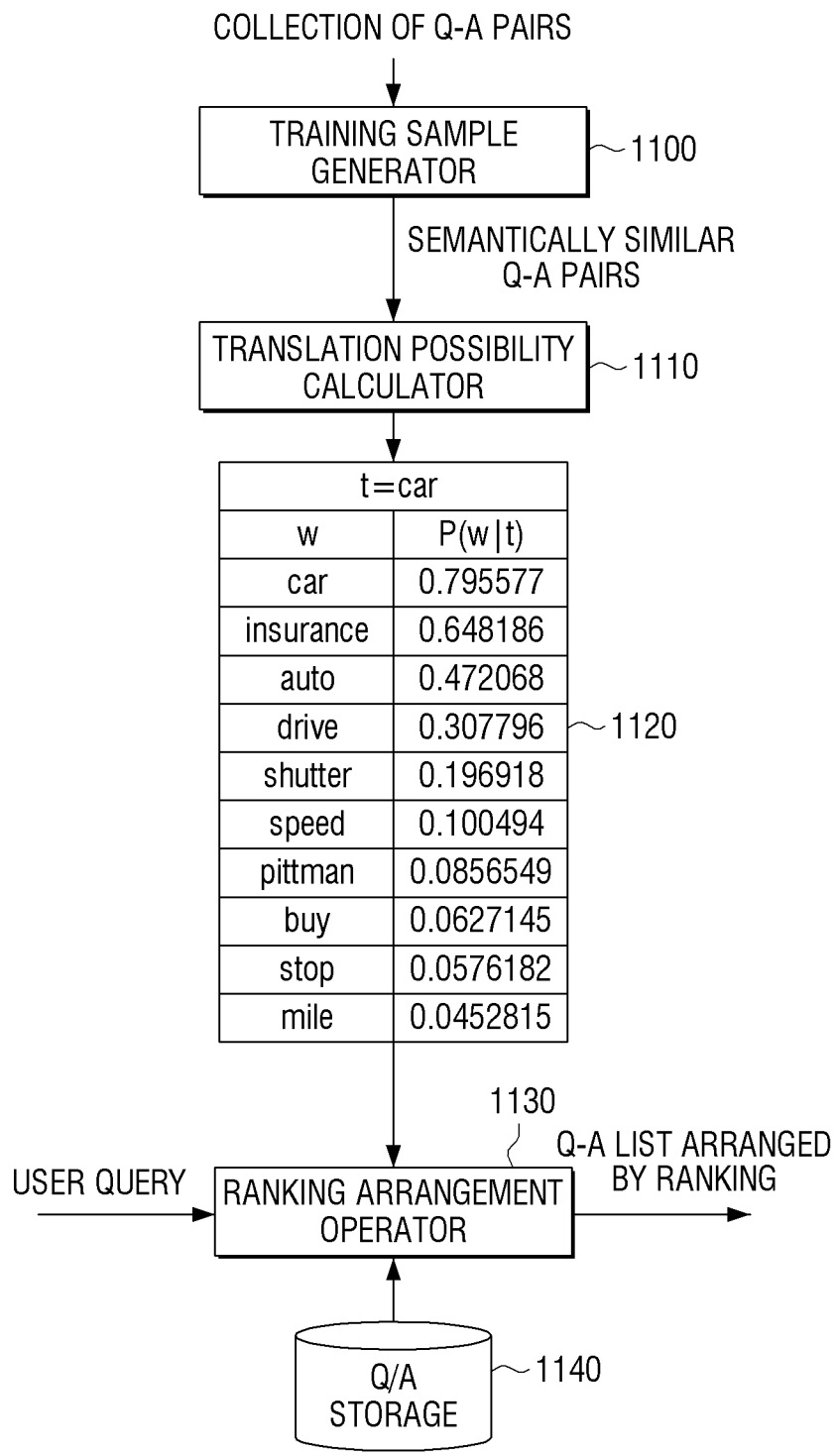
FIG. 11 is a diagram explaining a process of searching for a similarity query according to an embodiment of the present disclosure.

FIG. 11 is a diagram explaining a process of searching for a similar query according to an embodiment of the present disclosure.

For convenience in explanation, referring to FIGS. 1 and 11, the image display device 100 according to an embodiment of the present disclosure may perform a search for a similar query through two paths.

For example, if a query is initiated by the user, the image display device 100 searches an internal Q/A storage device 1140 and obtains information associated with the similar query as well as further information associated with the similar query that is personalized to the user. If there is a plurality of information associated with the similar query, the image display device 100 may present the plurality of information by the ranking in the form of a list to the user. Of course, it is not necessary to designate the ranking.

Further, if there is no information associated with the query, the image display device 100 may request information from the service providing device 120, receive information on the similarity query through the NLU, and generate a list to present to the user.

For example, the generation of the similar query information through the question understanding may be performed using a training sample generator 1100, a translation (or interpretation) possibility calculator 1110, and a storage element 1140. The training sample generator 1100 may extract a Q-A pair that is similar in semantic through model training with respect to collection of input Q-A pairs. The translation possibility calculator 1110 may calculate the translation possibility for the extracted Q-A pair. If the possibility is high as the result of calculation, the information is stored in a separate storage 1120, such as a DB, in the form of a table.

Further, if there is no similar query that is searched through the internal search of the image display device 100, a ranking arrangement operator 1130 may search for the similar query from the information stored in the service providing device 120 in the form of a table and provide the searched similarity query to the user.

Figure 12:
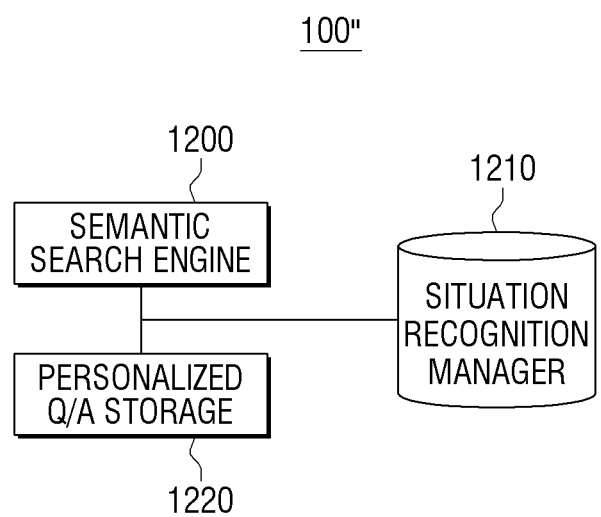
FIG. 12 is a block diagram illustrating another structure of an image display device of FIG. 1 according to an embodiment of the present disclosure.

FIG. 12 is a block diagram illustrating another structure of an image display device of FIG. 1 according to an embodiment of the present disclosure.

Referring to FIG. 12, an image display device 100" according to this embodiment of the present disclosure may be, for example, a mobile terminal, and may include a part or the whole of a semantic search engine 1200, a situation recognition manager 1210, and a personalized Q/A storage device 1220. The term "include a part or the whole" has the same meaning as that as described above.

The semantic search engine 1200 may serve to generate semantic information for a user's query.

The situation recognition manager 1210 may determine the user's current situation, and may search for the personalized Q/A storage device 1120 based on the determined current situation and the generated semantic information. Accordingly, situation recognition manager 1210 may search for a similar query based on the user's situation (e.g., location, time of day, etc.), even if the query of the same type as a previous query, and provide an answer to one query that is selected from similar previous queries.

The personalized Q/A storage 1220 stores personalized similar query information associated with the user. As described above, the similarity query information may be stored in terms of a place in which the user is located, current time when the query is initiated, a user profile, and a past Q/A usage pattern. Since this has been fully described, further explanation thereof will be omitted.

Figure 13:
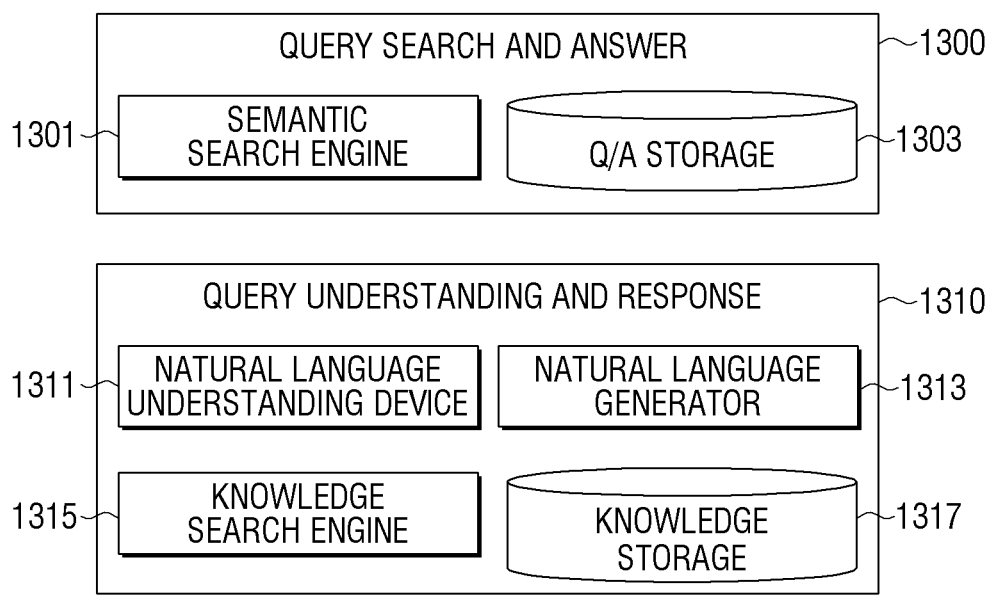
FIG. 13 is a block diagram illustrating the structure of a service providing device illustrated in FIG. 1 according to an embodiment of the present disclosure.

FIG. 13 is a block diagram illustrating the structure of a service providing device illustrated in FIG. 1 according to an embodiment of the present disclosure.

Referring to FIG. 13, the service providing device 120 according to an embodiment of the present disclosure may briefly include a query search and responder 1300 and a query understanding and responder 1310.

The query search and responder 1300 includes a semantic search engine 1301 and a Q/A storage device 1303. The semantic search engine and the Q/A storage device 1303 may perform operations to provide similar queries to the user. For this, the semantic information associated with the user's query is extracted, and the Q/A storage device 1303 is searched based on the extracted semantic information to provide information for the similarity query.

The query understanding and responder 1310 includes a part or the whole of a natural language understanding device 1311, a natural language generator 1313, a knowledge search engine 1315, and a knowledge storage device 1317. These constituent elements may serve to understand the query selected by the user from the similarity queries and provide a response related to the understood query. For example, the natural language understanding device 1311 may understand (or recognize) the selected query and the natural language generator 1313 may find a keyword through separation of the understood query by words. The knowledge search engine 1315 may then search the knowledge storage 1317 based on the keyword.

As described above, although it is explained that all constituent elements that constitute an embodiment of the present disclosure are combined into one or operation in combination, it is not necessary that the present disclosure is limited to such an embodiment. That is, within the purpose range of the present disclosure, one or more of all the constituent elements may be selectively combined to be operated. Further, although all the constituent elements can be implemented by independent hardware, a part or the whole of the constituent elements may be selectively combined, and may be implemented as a computer program having program modules that perform a part or the whole of the functions that are combined in one or plural hardware configurations. Codes and code segments that constitute the computer program may be easily induced by skilled in the art the present disclosure pertains. Such a computer program may be stored in a non-transitory computer readable recording medium in the form of a program. In an exemplary embodiment, the non-transitory computer readable medium is not a medium that stores data for a short period, such as a register, a cache, or a memory, but means a medium which semi-permanently stores data and is readable by a device. Specifically, various applications and programs as described above may be stored and provided in the non-transitory computer readable medium, such as, a compact disc (CD), a digital versatile disc (DVD), a hard disc, a Blu-ray disc, a universal serial bus (USB), a memory card, and a read only memory (ROM).

While the present disclosure has been shown and described with reference to various embodiments thereof, it will be understood by those skilled in the art that various changes in form and detail may be made therein without departing from the spirit and scope of the present disclosure as defined by the appended claims and their equivalents.

What is claimed is:

1. An image display device comprising:
   a display;
   a communication interface;
   a memory configured to store a plurality of questions; and
   a processor configured to:
      acquire a speech query associated with a query uttered by a user,
      identify a plurality of words from the speech query,
      identify a primary keyword from the identified plurality of words,
      generate a query list composed of candidate questions from a set of questions of the plurality of questions stored on the memory based on the identified primary keyword,
      control the display to display the query list, and
      perform an operation related to a candidate question selected from the displayed query list,
   wherein the set of questions of the plurality of questions is selected from among the plurality of questions based on user situation information,
   wherein the user situation information comprises one of a location of the user or a current time, and
   wherein the processor is further configured to, in response to identifying that there are no candidate questions corresponding the speech query in the memory, provide the query list composed of candidate questions received from an external device through the communication interface.

2. The image display device of claim 1, wherein the processor is further configured to:
   generate a query list interface including the query list, and
   control the display to display the generated query list interface.

3. The image display device of claim 2, wherein the generating of the query list is further based on at least one of a user profile or a past service usage pattern.

4. The image display device of claim 1,
   wherein the processor is further configured to recognize the acquired speech query, and
   wherein the generating of the query list is further based on the result of the recognition.

5. The image display device of claim 1,
   wherein the communication interface is further configured to receive a result of recognizing the acquired speech query from an external device, and
   wherein the generating of the query list is further based on the received result of the recognition.

6. The image display device of claim 1,
   wherein the processor is further configured to:
      separate the query having a form of a sentence into the plurality of words,
      tag parts of speech of the separated plurality of words,
      classify the plurality of words based on predetermined parts of speech, and
      generate index information associated with the classified plurality of words based on the parts of speech, and
   wherein the candidate questions are searched using the index information including same semantic information.

7. The image display device of claim 6, wherein the query list is generated based on the classified words.

8. The image display device of claim 1, wherein the processor is further configured to provide search information or answer information associated with the selected candidate question.

9. A method for driving an image display device, the method comprising:
   acquiring a speech query associated with a query uttered by a user;
   identifying a plurality of words from the speech query;
   identifying a primary keyword from the identified plurality of words;
   generating a query list composed of candidate questions from a set of questions of a plurality of questions stored on the image display device based on the identified primary keyword;
   displaying the query list; and
   performing an operation related to a candidate question selected from the displayed query list,
   wherein the set of questions of the plurality of questions is selected from among the plurality of questions based on user situation information,
   wherein the user situation information comprises one of a location of the user or a current time, and
   wherein, in response to identifying that there are no candidate questions corresponding the speech query in an internal memory, the method further comprises providing the query list composed of candidate questions received from an external device.

10. The method of claim 9, further comprising:
   generating a query list interface including the query list, wherein the displaying of the query list comprises displaying the generated query list interface.

11. The method of claim 10, wherein the generating of the query list is further based on at least one of a user profile or a past service usage pattern.

12. The method of claim 9, further comprising:
recognizing the acquired speech query,
wherein the generating of the query list is further based on the result of the recognition.

13. The method of claim 9, further comprising:
receiving a result of recognizing the acquired speech query from an external device,
wherein the generating of the query list is further based on the received result of the recognition.

14. The method of claim 9, further comprising:
separating the query having a form of a sentence into the plurality of words;
tagging parts of speech of the separated plurality of words;
classifying the plurality of words based on predetermined parts of speech; and
generating index information associated with the classified plurality of words based on the parts of speech, and
wherein the candidate questions are searched using the index information including same semantic information.

15. The method of claim 14, wherein the query list is generated based on the classified words.

16. The method of claim 9, wherein the performing of the operation comprises performing an operation to provide search information or answer information associated with the selected candidate question.

17. A non-transitory computer readable recording medium including a program that, when executed by a processor, causes the processor to control for:
acquiring a speech query associated with a query uttered by a user;
identifying a plurality of words from the speech query;
identifying a primary keyword from the identified plurality of words;
generating a query list composed of candidate questions from a set of questions of a plurality of questions stored on an image display device including the non-transitory computer readable recording medium based on the identified primary keyword;
displaying the query list; and
performing an operation related to a candidate question selected from the displayed query list,
wherein the set of questions of the plurality of questions is selected from among the plurality of questions based on user situation information,
wherein the user situation information comprises one of a location of the user or a current time, and
wherein the program, when executed by a processor, further causes the processor to control for, in response to identifying that there are no candidate questions corresponding the speech query in an internal memory, providing the query list composed of candidate questions received from an external device.

18. The non-transitory computer readable recording medium of claim 17, wherein the generating of the query list is further based on at least one of a user profile or a past service usage pattern.

* * * * *